United States Patent
Abbott, Jr. et al.

(10) Patent No.: US 11,541,568 B2
(45) Date of Patent: ***Jan. 3, 2023

(54) THREE-DIMENSIONAL (3D) PRINTING WITH A DETAILING AGENT FLUID AND A LIQUID FUNCTIONAL MATERIAL

(71) Applicant: Hewlett-Packard Development Company, L.P., Houston, TX (US)

(72) Inventors: James Elmer Abbott, Jr., Corvallis, OR (US); Vladek Kasperchik, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 489 days.

This patent is subject to a terminal disclaimer.

(21) Appl. No.: 15/763,183

(22) PCT Filed: Jan. 28, 2016

(86) PCT No.: PCT/US2016/015419
§ 371 (c)(1),
(2) Date: Mar. 26, 2018

(87) PCT Pub. No.: WO2017/131709
PCT Pub. Date: Aug. 3, 2017

(65) Prior Publication Data
US 2018/0272560 A1    Sep. 27, 2018

(51) Int. Cl.
*B33Y 30/00* (2015.01)
*B33Y 10/00* (2015.01)
(Continued)

(52) U.S. Cl.
CPC .......... *B28B 1/001* (2013.01); *B28B 17/0081* (2013.01); *B29C 64/165* (2017.08);
(Continued)

(58) Field of Classification Search
CPC ......... B28B 1/001; B28B 1/004; B33Y 10/00; B33Y 30/00; B29C 64/112; B29C 64/165; B29C 64/307; B29C 67/242
See application file for complete search history.

(56) References Cited

U.S. PATENT DOCUMENTS 2,767,431 A * 10/1956 De Laubarede ...... B29C 48/153
156/244.14
2,984,870 A *  5/1961 Warnken ................. B29C 49/44
156/165

(Continued)

FOREIGN PATENT DOCUMENTS

WO    WO-2014/134224    9/2014
WO    WO-2015/023612    2/2015

*Primary Examiner* — Francisco W Tschen
*Assistant Examiner* — Edgaredmanuel Troche
(74) *Attorney, Agent, or Firm* — Shook, Hardy & Bacon L.L.P.

(57) ABSTRACT

In an example of a three-dimensional (3D) printing method, a ceramic build material is applied. A detailing agent fluid is applied to a portion of the ceramic build material. The detailing agent fluid includes a cationic polymer. A liquid functional material, including an anionically stabilized susceptor material, is applied to another portion of the ceramic build material that is in contact with the portion of the ceramic build material having the detailing agent fluid thereon, such that at least some of the anionically stabilized susceptor material reacts with at least some of the cationic polymer that is in contact therewith to prevent spreading of the anionically stabilized susceptor material.

16 Claims, 5 Drawing Sheets

(51) Int. Cl.
  *B29C 64/165* (2017.01)
  *B33Y 70/10* (2020.01)
  *B33Y 50/02* (2015.01)
  *B29C 64/20* (2017.01)
  *B29C 64/393* (2017.01)
  *B28B 1/00* (2006.01)
  *B29C 67/00* (2017.01)
  *B28B 17/00* (2006.01)

(52) U.S. Cl.
  CPC ............ *B29C 64/20* (2017.08); *B29C 64/393* (2017.08); *B29C 67/00* (2013.01); *B33Y 10/00* (2014.12); *B33Y 30/00* (2014.12); *B33Y 50/02* (2014.12); *B33Y 70/10* (2020.01)

(56) References Cited

U.S. PATENT DOCUMENTS

| | | | | |
|---|---|---|---|---|
| 2,990,577 | A * | 7/1961 | Laubarede | B29C 48/153 425/114 |
| 3,191,230 | A * | 6/1965 | Sheldon | B29C 48/153 425/113 |
| 3,194,273 | A * | 7/1965 | Laubarede | B29C 63/26 138/125 |
| 3,905,853 | A * | 9/1975 | Stent | F16L 11/127 156/187 |
| 4,702,867 | A * | 10/1987 | Sejimo | B29D 23/001 264/474 |
| 5,057,195 | A * | 10/1991 | Ueda | C09D 5/44 204/508 |
| 5,137,672 | A * | 8/1992 | Fujiu | B29C 48/395 264/130 |
| 5,204,055 | A * | 4/1993 | Sachs | B28B 1/001 419/2 |
| 5,656,117 | A * | 8/1997 | Wood | F16L 55/1654 156/287 |
| 6,217,816 | B1 * | 4/2001 | Tang | B28B 11/243 264/497 |
| 7,348,075 | B2 * | 3/2008 | Farr | B28B 7/465 428/701 |
| 7,455,804 | B2 * | 11/2008 | Patel | B33Y 30/00 264/460 |
| 7,731,890 | B2 * | 6/2010 | Gale | B29C 55/22 264/534 |
| 7,795,349 | B2 * | 9/2010 | Bredt | B29C 64/165 525/193 |
| 8,609,249 | B2 * | 12/2013 | Hansen | B01D 67/0088 428/421 |
| 8,784,710 | B2 * | 7/2014 | Hansen | B01D 53/228 264/211.13 |
| 9,216,813 | B2 * | 12/2015 | Bright | B64C 3/56 |
| 9,630,376 | B2 * | 4/2017 | Griess | B32B 5/26 |
| 9,776,376 | B2 * | 10/2017 | Swartz | B29C 64/147 |
| 9,950,480 | B2 * | 4/2018 | Tsotsis | B29C 70/68 |
| 10,107,438 | B2 * | 10/2018 | Tailor | F16L 47/22 |
| 11,020,874 | B2 * | 6/2021 | Abbott, Jr. | B33Y 30/00 |
| 2002/0054971 | A1 * | 5/2002 | Shimojo | B32B 1/08 428/36.9 |
| 2002/0145213 | A1 * | 10/2002 | Liu | B33Y 50/02 264/40.1 |
| 2005/0087903 | A1 | 4/2005 | Farr et al. | |
| 2005/0197431 | A1 | 9/2005 | Bredt et al. | |
| 2005/0280185 | A1 * | 12/2005 | Russell | B28B 7/465 264/308 |
| 2006/0137839 | A1 * | 6/2006 | Ottelin | D21C 7/08 162/52 |
| 2006/0192315 | A1 * | 8/2006 | Farr | B33Y 10/00 264/113 |
| 2006/0208388 | A1 * | 9/2006 | Bredt | B29C 64/165 264/123 |
| 2007/0241482 | A1 | 10/2007 | Giller et al. | |
| 2012/0325965 | A1 * | 12/2012 | Bright | B64C 3/56 244/123.11 |
| 2015/0163958 | A1 * | 6/2015 | Oguma | H05K 7/20463 264/36.22 |
| 2016/0031155 | A1 * | 2/2016 | Tyler | B29C 48/02 264/129 |
| 2016/0167132 | A1 * | 6/2016 | Panat | H05K 3/22 419/53 |
| 2016/0281265 | A1 * | 9/2016 | Bueno | B29C 48/0018 |
| 2017/0297053 | A1 * | 10/2017 | Tyler | B29C 70/523 |
| 2018/0178447 | A1 * | 6/2018 | Abbott, Jr. | B28B 1/001 |
| 2019/0338881 | A1 * | 11/2019 | Bergman | B29C 70/845 |

* cited by examiner

THREE-DIMENSIONAL (3D) PRINTING WITH A DETAILING AGENT FLUID AND A LIQUID FUNCTIONAL MATERIAL

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

In some examples of three-dimensional (3D) printing, an entire layer of a build material (also referred to as build material particles) is exposed to radiation, but a selected region (in some instances less than the entire layer) of the build material is sintered or fused and hardened to become a layer of a 3D part. When microwave energy is used for sintering or fusing, this process has been referred to as Microwave Area Processing. In some examples, a liquid functional material is selectively deposited in contact with the selected region of the build material, thereby patterning the selected region. The liquid functional material is capable of penetrating into the layer of the build material and spreading onto the exterior surface of the build material. Some liquid functional materials are also capable of absorbing radiation and converting the absorbed radiation to thermal energy, which in turn melts or sinters the build material that is in contact with the liquid functional material. Melting or sintering causes the build material to fuse, bind, cure, etc. to form the layer of the 3D part. Other examples of the liquid functional material may be fusing aids, which lower the temperature at which fusing, binding, curing, etc. takes place. Still other liquid functional materials may be used to modify the build material properties, e.g., electrical properties, magnetic properties, thermal conductivity, etc.

During other examples of 3D printing, a liquid functional material is selectively applied to a layer of build material, and then another layer of the build material is applied thereon. The liquid functional material may be applied to this other layer of build material, and these processes may be repeated to form a green body of the 3D part that is ultimately to be formed. The green body may then be exposed to radiation and heating to melt or sinter, densify, fuse, and harden the green body to form the 3D part. When microwave energy is used for sintering or fusing, this process has been referred to as Microwave Volume Processing.

In some instances, to render the selected region of build material highly absorptive of the applied radiation or capable of fusing at lower temperature, or to modify the local material properties, relatively large quantities of the liquid functional material may be applied. Voids between the build material can form a network of capillary channels within the build material layer(s), and capillary forces arising from wetting the selected region of the build material with the liquid functional material may lead to uncontrolled wicking, propagation or diffusion of the liquid functional material into surrounding build material (i.e., outside the selected region). This may result in the subsequent solidification of area(s)/portion(s) of the build material that were not intended to be solidified. This may result, for example, in a reduction in the overall dimensional accuracy of generated 3D objects (i.e., parts). For example, edge acuity may be undesirably rough, undefined, etc.

In some of the examples disclosed herein, the effects of liquid functional material propagation or diffusion during formation of the 3D object may be managed by delivering an example of a detailing agent fluid disclosed herein to portion(s) of the build material and by delivering an example of the liquid functional material disclosed herein to other portion(s) of the build material that is/are in contact with the portion(s) exposed to the detailing agent. Moreover, the detailing agent fluid includes a cationic polymer that is capable of precipitating (or crashing) a dispersion of an anionically stabilized susceptor material (or anionically stabilized material) out of the liquid functional material when the two fluids come in contact. The precipitation/crashing restricts the motion of the anionically stabilized susceptor material (or anionically stabilized material), and thus prevents further propagation or diffusion (by capillary wicking) of the anionically stabilized susceptor material (or anionically stabilized material) throughout the build material. As such, the detailing agent fluid keeps active solid ingredients (i.e., the anionically stabilized susceptor material or the anionically stabilized material) from moving through/into build material that is treated with the detailing agent fluid. Since, in some of the examples disclosed herein, the detailing agent fluid prevents undesirable spreading of the material responsible for aiding in microwave or radio frequency (RF) radiation absorption and sintering/fusing, the detailing agent does not contribute to object growth (by fusing build material particles together), but rather contributes to overall dimensional accuracy and edge acuity.

Figure 1A:
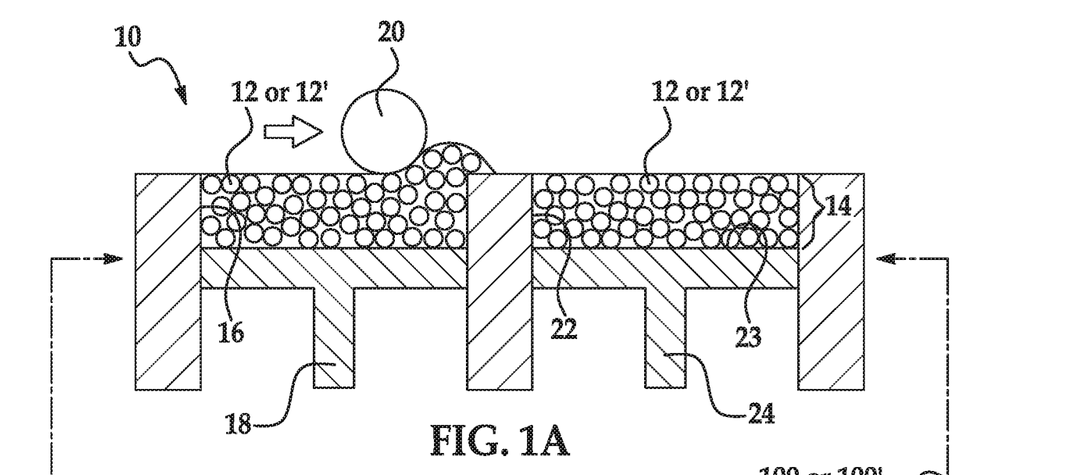
FIGS. 1A through 1C are schematic cross-sectional views depicting the formation of layer(s) of a 3D object using examples of a 3D printing method disclosed herein.
Figure 1B:
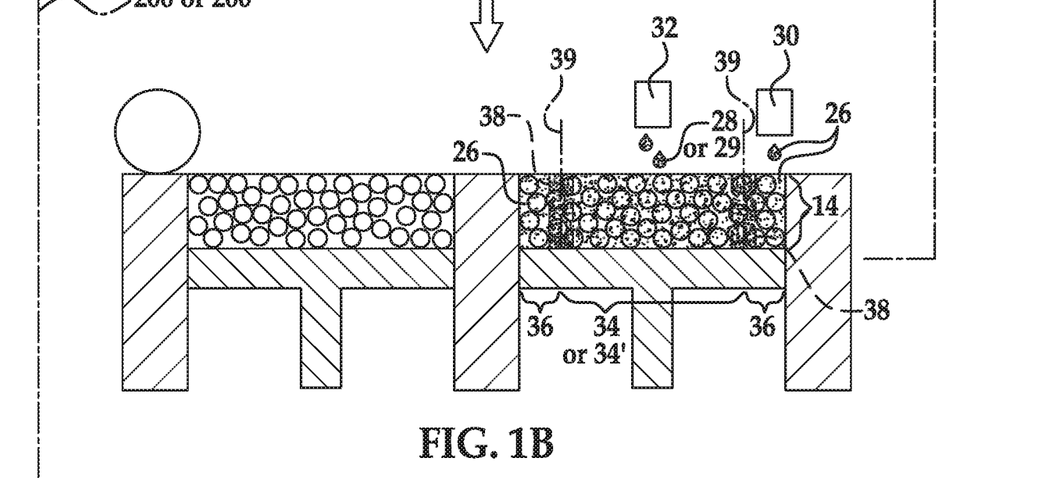
Figure 1C:
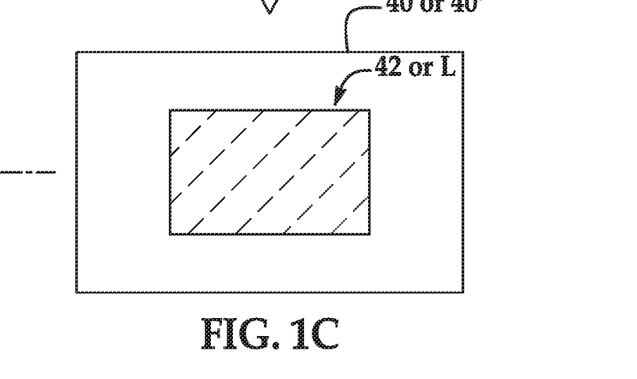

An example of the 3D printing method is schematically depicted in FIGS. 1A through 1C. It is to be understood that the method shown in FIGS. 1A through 1C will be discussed in detail herein, and in some instances, FIGS. 3 and 4 will be discussed in conjunction with FIGS. 1A through 1C.

As shown in FIG. 1A, the method includes applying the ceramic build material 12 using a 3D printing system 10. In the example shown in FIG. 1A, one layer 14 of the ceramic build material 12 has been applied, as will be discussed in more detail below.

The ceramic build material 12 may be any ceramic particles. Examples of suitable ceramic particles include metal oxides, inorganic glasses, carbides, nitrides, and borides. Some specific examples include alumina ($Al_2O_3$), $Na_2O/CaO/SiO_2$ glass (soda-lime glass), silicon nitride ($Si_3N_4$), silicon dioxide ($SiO_2$), zirconia ($ZrO_2$), titanium dioxide ($TiO_2$), glass frit materials, or combinations thereof. As an example of one suitable combination, 30 wt % glass may be mixed with 70 wt % alumina. In some examples, the ceramic build material 12 has low absorptivity of the energy that is applied during 3D printing. One example of low absorptivity is that the ceramic build material 12 has a loss tangent of <0.01 for the wavelength of energy that is applied or at the frequency of the energy that is applied. Another example of low absorptivity is that the ceramic build material 12 absorbs less than 10% of microwave or RF radiation at ambient temperature (i.e., air temperature of any environment where a human can function comfortably without means of protection, e.g., from about 18° C. to about 30° C.).

The ceramic build material 12 may have a melting point ranging from about 200° C. to about 2800° C. As examples, the build material 12 may be a glass frit having a melting point of about 220° C., or a metal oxide having a melting point ranging from about 1000° C. to about 2800° C.

The ceramic build material 12 may be made up of similarly sized particles or differently sized particles. The term "size" or "particle size," as used herein, refers to the diameter of a substantially spherical particle, or the average diameter of a non-spherical particle (i.e., the average of multiple diameters across the particle), or the effective diameter of a non-spherical particle (i.e., the diameter of a sphere with the same mass and density as the non-spherical particle). A substantially spherical particle (i.e., spherical or near-spherical) has a sphericity of >0.84. Thus, any individual particles having a sphericity of <0.84 are considered non-spherical (irregularly shaped). In an example, the particle size of the ceramic build material particles 12 is greater than or equal to 10 μm for materials with a bulk density of greater than or equal to 3. For lower density particles, the particle size can be much larger. In an example, the particle size of the ceramic build materials 12 ranges from about 10 μm to about 500 μm. In another example, the particle size of the ceramic build material particles 12 ranges from about 200 μm to about 500 μm. Smaller particle sizes may be used, for example, when they are mixed with build materials 12 having a larger particle size. For example, the ceramic build material 12 may include a mixture of particles in which some particles have a size less than 1 μm (i.e., nanoscale particles) and other particles have a size equal to or greater than 10 μm. Also as previously mentioned, the build material 12 may include similarly sized particles, for example, all the particles having a size of about 10 μm.

In an example, the ceramic build material 12 is a dry powder.

In the example shown at FIG. 1A, applying the ceramic build material 12 includes the use of the printing system 10. The printing system 10 may include a supply bed 16 (including a supply of the ceramic build material 12), a delivery piston 18, a roller 20, a fabrication bed 22 (having a contact surface 23), and a fabrication piston 24. Each of these physical elements may be operatively connected to a central processing unit or controller (not shown) of the printing system 10. The central processing unit (e.g., running computer readable instructions stored on a non-transitory, tangible computer readable storage medium) manipulates and transforms data represented as physical (electronic) quantities within the printer's registers and memories in order to control the physical elements to create the 3D object 42 (FIG. 1C). The data for the selective delivery of the ceramic build material 12, the detailing agent fluid 26 (FIG. 1B), the liquid functional material 28 (FIG. 1B), etc. may be derived from a model of the 3D object 42 to be formed. For example, the instructions may cause the controller to utilize a build material distributor to dispense a layer 14 of the ceramic build material 12, and to utilize applicator(s) 30, 32 (FIG. 1B) (e.g., inkjet applicator(s)) to selectively dispense the detailing agent fluid 26 and the liquid functional material 28.

The delivery piston 18 and the fabrication piston 24 may be the same type of piston, but are programmed to move in opposite directions. In an example, when a layer of the 3D object 42 is to be formed, the delivery piston 18 may be programmed to push a predetermined amount of the ceramic build material 12 out of the opening in the supply bed 16 and the fabrication piston 24 may be programmed to move in the opposite direction of the delivery piston 18 in order to increase the depth of the fabrication bed 22. The delivery piston 18 will advance enough so that when the roller 20 pushes the build material 12 into the fabrication bed 22 and onto the contact surface 23, the depth of the fabrication bed 22 is sufficient so that a layer 14 of the ceramic build material 12 may be formed in the bed 22. The roller 20 is capable of spreading the ceramic build material 12 into the fabrication bed 22 to form the layer 14, which is relatively uniform in thickness. In an example, the thickness of the layer 14 ranges from about 90 μm to about 110 μm, although thinner or thicker layers may also be used. For example, the thickness of the layer 14 may range from about 20 μm to about 200 μm, or from about 50 μm to about 1000 μm.

It is to be understood that the roller 20 is a build material distributor that may be replaced by other tools, such as a blade that may be useful for spreading different types of powders, or a combination of a roller and a blade.

The supply bed 22 that is shown is one example, and could be replaced with another suitable delivery system to supply the build material 12 to the fabrication bed 22. Examples of other suitable delivery systems or distributors include a hopper, an auger conveyer, or the like.

The fabrication bed 22 that is shown is also one example, and could be replaced with another support member, such as a platen, a print bed, a glass plate, or another build surface.

After the ceramic build material 12 is applied, the detailing agent fluid 26 and the liquid functional material 28 are respectively and selectively applied, as shown at FIG. 1B.

The detailing agent fluid 26 is an aqueous-based (i.e., water-based) based fluid including the cationic polymer. The cationic polymer may be a water-soluble or water-dispersible polymer having molecules with some positively charged group in its structure. The positively charged groups render the cationic polymer reactive by means of electrostatic attraction with the anionically stabilized susceptor material in the liquid functional material 28 when the fluids 26, 28 come into contact with one another.

The cationic polymer may be a homopolymer or a copolymer. Example of suitable cationic polymers may be polyamines having more than 10 monomer units. In some instances, the polyamine has more than 20 monomer units. An example of a commercially available cationic polyamine is FLOQUAT™ FL 2350 (available from SNF sas). Other suitable cationic polymers may include polymers having guanidinium functionalities, polymers having fully quaternized ammonium functionalities (e.g., quaternized polyamine copolymers), cationic polymers that do not have primary or secondary ammonium functionalities (e.g., polyallylamine or polyethylene imine), and combinations thereof. The cationic polymer may have a weight average molecular weight of less than 500,000 $M_w$, and in one aspect, less than 5,000 $M_w$. In some examples, the molecular weight ($M_w$) is selected to achieve a balance between efficient fixing of the anionically stabilized susceptor material and efficient jetting of the detailing agent fluid 26. The cationic polymer may also have high charge densities to improve fixing efficiencies. As such, the cationic charge densities can be higher than 1000 microequivalents per gram cationic functionality. In one aspect, the cationic charge densities can be higher than 4000 microequivalents per gram cationic functionality.

The cationic polymer may be present in the detailing agent fluid 26 in an amount ranging from about 0.1 wt % to about 20 wt % based upon the total wt % of the detailing agent fluid 26. In an example, the detailing agent fluid 26 includes from about 0.5 wt % to about 10 wt % of the cationic polymer. In an example, the detailing agent fluid 26 includes from about 2.5 wt % to about 7.5 wt % of the cationic polymer. When the cationic polymer is contained in a solution, the amount added may account for the weight percent of active cationic polymer in the solution. For example, if the solution includes 50% active cationic polymer, and the target weight percent for the detailing agent fluid 26 is 2.5 wt %, the detailing agent fluid 26 may include about 5.0 wt % of the solution.

In addition to water and the cationic polymer, the detailing agent fluid 26 may also include co-solvent(s) and surfactant(s). The co-solvent(s) may be used to improve decap performance (i.e., the ability of the fluid to readily eject from a printhead, upon prolonged exposure to air), and the surfactant(s) may be used to quickly wet the build material 12.

Classes of organic co-solvents that may be used include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Examples of some suitable co-solvents include water-soluble high-boiling point solvents (i.e., humectants), which have a boiling point of at least 120° C., or higher. Some examples of high-boiling point solvents include 2-pyrrolidone (boiling point of about 245° C.), 2-methyl-1,3-propanediol (boiling point ranging from about 123° C. to about 125° C.), and combinations thereof. The co-solvent(s) may be present in the detailing agent fluid 26 in a total amount ranging from about 1 wt % to about 30 wt % based upon the total wt % of the detailing agent fluid 26. In an example, the detailing agent fluid 26 includes about 16 wt % of 2-pyrrolidone. In another example, the detailing agent fluid 26 includes about 16 wt % of 2-pyrrolidone and about 9 wt % of 2-methyl-1,3-propanediol.

Examples of suitable surfactants include nonionic surfactants. Some specific examples of nonionic surfactants include a nonionic fluorosurfactant (e.g., CAPSTONE® fluorosurfactants (previously known as ZONYL FSO), such as CAPSTONE® FS-31, from DuPont), a secondary alcohol ethoxylate, nonionic surfactant (e.g., TERGITOL™ 15-S-9, TERGITOL™ 15-S-7, TERGITOL™ 15-S-5, each of which is available from The Dow Chemical Co.), a nonionic, ethoxylated low-foam wetting agent (e.g., SURFYNOL® 440 from Air Products and Chemicals, Inc.), an ethoxylated wetting agent and molecular defoamer (e.g., SURFYNOL® 420 from Air Products and Chemicals, Inc.), an alkoxylated alcohol (e.g., TEGO® Wet 510 from Evonik Industries AG), a self-emulsifiable, nonionic wetting agent based on acetylenic diol chemistry (e.g., SURFYNOL® SEF from Air Products and Chemicals, Inc.), a nonionic, acetylenic diol surface active agent (e.g., SURFYNOL® 104 from Air Products and Chemicals, Inc.), and combinations thereof. The surfactant(s) may be present in the detailing agent fluid 26 in a total amount ranging from about 0.05 wt % to about 5 wt % based upon the total wt % of the detailing agent fluid 26. In an example, the detailing agent fluid includes up to 2 wt % of the surfactant. When the surfactant is contained in a solution or dispersion, the amount added may account for the weight percent of active surfactant in the solution or dispersion. For example, if the solution or dispersion includes 2% active surfactant, and the target weight percent for the detailing agent fluid 26 is 0.2 wt %, the detailing agent fluid 26 may include about 10 wt % of the solution or dispersion. In an example, the detailing agent fluid 26 includes about 0.4 wt % of TERGITOL™ 15-S-7. In another example, the detailing agent fluid 26 includes about 0.5 wt % of TERGITOL™ 15-S-7 and about 0.4 wt % of CAPSTONE® FS-31.

The balance of the detailing agent fluid 26 is water (e.g., deionized water). As such, the amount of water may vary depending upon the weight percent of the other detailing agent fluid components.

Some examples of the detailing agent fluid 26 may include antimicrobial agent(s) or other suitable additives. However, it is to be understood that the detailing agent fluid 26 disclosed herein does not include any components with anionic or potentially anionic charges capable of destabilizing the cationic polymer present therein.

The liquid functional material 28 is an aqueous (i.e., water) based fluid including the anionically stabilized susceptor material. The anionically stabilized susceptor material may have a loss tangent of >0.01 at a frequency of the energy delivered applied during the fusing operation associated with 3D printing. As an example, the anionically stabilized susceptor material may have a loss tangent of >0.01 within a range of microwave radiation frequencies (e.g., 300 MHz to 300 GHz). As another example, the anionically stabilized susceptor material may have a loss tangent of >0.01 within a range of microwave and RF radiation frequencies (e.g., 5 kHz to 300 GHz). The anionically stabilized susceptor material may be carbon black particles having negatively charged groups at a surface of the particle (i.e., self-dispersed carbon black particles), carbon black particles having a negatively charged polymeric dispersant absorbed to a surface of the particle, ferromagnetic metal oxide particles having an anionic dispersing species absorbed to a surface of the particle, semiconductor or conductive oxide particles having an anionic dispersing species absorbed to a surface of the particle, and combinations thereof. The negatively charged groups at the surface of carbon black particles may be deprotonized carboxylic (—COOH), sulfo (—$SO_3H$), or other acidic groups. An example of commercially available carbon black particles having negatively charged groups at the surface of the particles is CAB-O-JET® 300 (available from Cabot Corp.). The negatively charged polymeric dispersant absorbed to the surface of carbon black particles may be water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.) or water-soluble styrene-maleic anhydride copolymers/resins. The ferromagnetic metal oxide particles may be magnetite ($Fe_3O_4$) or complex ferrites (e.g., $Fe_2O_3$/CoO/$Mn_2O_3$ particles including $Fe_2O_3$, CoO, and $Mn_2O_3$). It is to be understood that other ferromagnetic materials may also be used. The ceramic material with electrical conductivity or semiconductor properties used in particulate state may include CoO, CuO, SiC, or other oxide and non-oxide ceramics with appropriate electrical conductivity attributes. The anionic dispersing species absorbed to the surface of the ferromagnetic metal oxide particles or the semiconductor or conductive oxide particles may be multi-carboxylic organic acids (e.g., citric acid), phosphate ions, or water-soluble polymers containing carboxylic groups or sulfo groups (i.e., polycarboxylates or polysulfonates).

The negatively charged groups and/or species provide negative charges at the surface of the anionically stabilized susceptor material. The negative charges render the anionically stabilized susceptor material reactive by means of electrostatic attraction with the cationic polymer in the detailing agent fluid 26 when the fluids 26, 28 come into contact with one another. The anionically stabilized susceptor material may be present in the liquid functional material 28 in an amount ranging from about 1 wt % to about 60 wt % based upon the total wt % of the liquid functional material 28. When the anionically stabilized susceptor material is contained in a solution or dispersion, the amount added may account for the weight percent of active anionically stabilized susceptor material in the solution or dispersion. For example, if the solution or dispersion includes 15% active anionically stabilized susceptor material, and the target weight percent for the liquid functional material 28 is 8.0 wt %, the detailing agent fluid 26 may include about 53 wt % of the solution or dispersion.

In addition to water and the anionically stabilized susceptor material, the liquid functional material 28 may also include co-solvent(s) and/or surfactant(s).

The liquid functional material 28 may include an organic co-solvent present in total in the liquid functional material 28 in an amount ranging from about 5 wt % to about 20 wt % (based on the total wt % of the liquid functional material 28). It is to be understood that other amounts outside of this range may also be used depending, at least in part, on the jetting architecture used to dispense the liquid functional material 28. The organic co-solvent may be any water miscible, high-boiling point solvent, which has a boiling point of at least 120° C. Classes of organic co-solvents that may be used include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the liquid functional material 28 may include 2-pyrrolidone.

The liquid functional material 28 may also include surfactant(s). As an example, the liquid functional material 28 may include non-ionic and/or anionic surfactants, which may be present in an amount ranging from about 0.01 wt % to about 5 wt % based on the total wt % of the liquid functional material 28 (the amount of which may account for the percent of actives in a solution or dispersion). Any of the previously listed surfactants may be used in the liquid functional material 28.

The balance of the liquid functional material 28 is water (e.g., deionized water). As such, the amount of water may vary depending upon the weight percent of the other liquid functional material components.

The liquid functional material 28 may also include anti-microbial agent(s), anti-kogation agent(s), chelating agent(s), and/or other additives.

The liquid functional material 28 may also include anti-microbial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, and combinations thereof. In an example, the fluid 28 may include a total amount of antimicrobial agents that ranges from about 0.1 wt % to about 0.25 wt %.

An anti-kogation agent may also be included in the liquid functional material 28. Kogation refers to the deposit of dried solids on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3 Å or CRODAFOS™ N-3 acid) or dextran 500 k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the fluid 28 in an amount ranging from about 0.1 wt % to about 1 wt % of the total wt %.

The liquid functional material 28 may also include a chelating agent. Examples of suitable chelating agents include disodium ethylenediaminetetraacetic acid (EDTA-Na) and methylglycinediacetic acid (e.g., TRILON® M from BASF Corp.). Whether a single chelating agent is used or a combination of chelating agents is used, the total amount of chelating agent(s) in the fluid 28 may range from 0 wt % to about 1 wt % based on the total wt %.

In the examples of the method shown in FIGS. 1A through 1C, the detailing agent fluid 26 and the liquid functional material 28 are applied to different portion(s) 36, 34 of the build material 12 in the layer 14. At certain portion(s) 38 of the build material 12, the detailing agent fluid 26 and the liquid functional material 28 come into contact with each other. At these portion(s) 38, and when the fluids 26, 28 contact each other, the cationic polymer in the detailing agent fluid 26 precipitates the anionically stabilized susceptor material out of the liquid functional material 28, which restricts the motion (i.e., prevents spreading) of the anionically stabilized susceptor material.

The detailing agent fluid 26 may be selectively applied at any portion 36 of the ceramic build material 12 where sintering/fusing is not desirable and where it is desirable to prevent spreading of the anionically stabilized susceptor material. As examples, the detailing agent fluid 26 may be selectively applied outside of an edge boundary 39 (i.e., the outermost portion where the liquid functional material 28 is (to be) selectively applied onto the build material 12) and/or at areas of the ceramic build material 12 where holes, slots, or other apertures are to be defined in the 3D object 42. The edge boundary 39 may define a perimeter or border of the 3D object 42.

The liquid functional material 28 may be selectively applied at any portion 34 of the ceramic build material 12 where sintering/fusing is desirable. In these examples, the presence of the anionically stabilized susceptor material defines the build material portion(s) 34 that are capable of being heated with microwave or RF energy.

Figure 2:
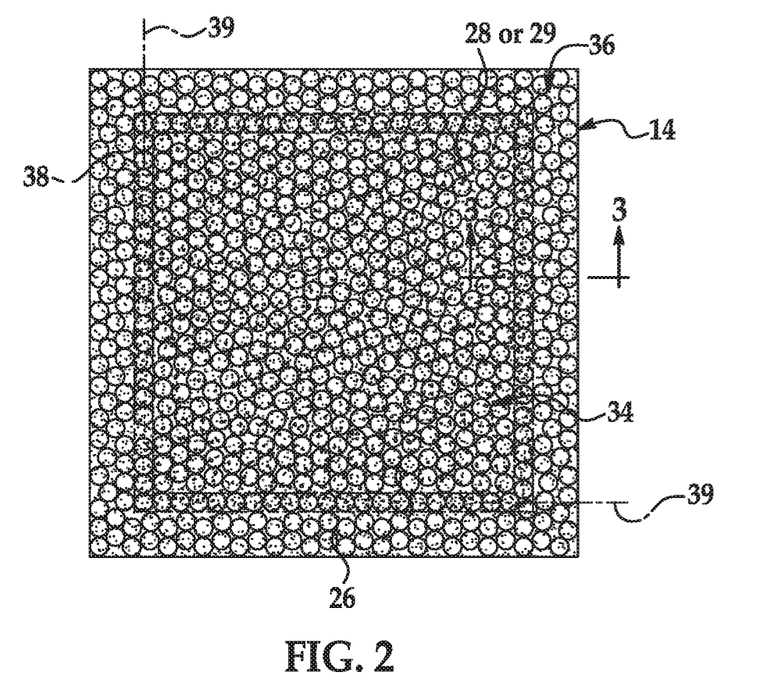
FIG. 2 is a top, schematic view of the build material of FIG. 1B, with a liquid functional material applied on a portion thereof within a cross-section of the 3D object to be formed, and with a detailing agent fluid applied on another portion thereof at an edge boundary.

In an example, it may be desirable to enhance, refine, smooth, etc. the edge(s) of the layer of the 3D object 42 that is being formed. In this example, the liquid functional material 28 may be selectively applied according to the pattern of a cross-section (which is parallel to the contact surface 23) for the layer of the 3D object 42, and the detailing agent fluid 26 may be selectively applied along at least part of an edge boundary 39 (or perimeter, border, etc.) of that cross-section. An example of this is shown in FIG. 1B (side cross-sectional view of the system 10) and in FIG. 2 (top view of the build material layer 14 in the fabrication bed 22). In the example shown in these figures, the shape of the 3D object layer to be formed is a cube or rectangular prism, and the pattern of the cross-section that is parallel to the contact surface 23 is a square or rectangle having edge boundary 39. The ceramic build material 12 within the edge boundary 39 is the portion 34 upon which the liquid functional material 28 is selectively applied. The build material 12 positioned between the edge boundary 39 and the edges of the fabrication bed 22 is outside the pattern of the cross-section, and thus is the portion 36 upon which the detailing agent fluid 26 is selectively applied. The portion 38 is where the detailing agent fluid 26 and the liquid functional material 28 come into contact with each other, and thus includes some build material 12 within the portion(s) 34 and some build material 12 within the portion(s) 36.

Figure 3:
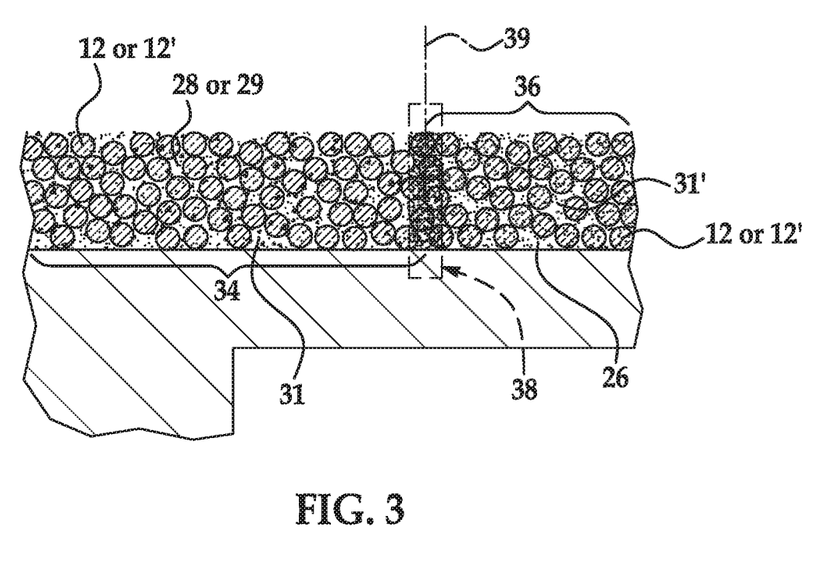
FIG. 3 is a side cross-sectional view taken along line 3-3 of FIG. 2.

Referring briefly to FIG. 3, a cross-section (along line 3-3 of FIG. 2) of the portions 34, 36, 38 is depicted. It is to be understood that this cross-section is perpendicular to the contact surface 23 and is not the same as the cross-section of the pattern of the layer of the 3D object 42. The view in FIG. 3 illustrates some of the ceramic build material 12 on the contact surface 23 after the liquid functional material 28 and detailing agent fluid 26 are applied thereon. As depicted, the liquid functional material 28 penetrates into at least some of the voids 31 between the particles of the ceramic build material 12 within the portion 34. Similarly, the detailing agent fluid 26 penetrates into at least some of the voids 31' between the particles of the ceramic build material 12 within the portion 36 outside of the edge boundary 39. In the example shown in FIGS. 1B, 2, and 3, the detailing agent fluid 26 comes into contact with at least some of the liquid functional material 28 at or near the edge boundary 39, and the cationic polymer in the detailing agent fluid 26 precipitates the anionically stabilized susceptor material out of the liquid functional material 28. As such, the detailing agent fluid 26 is capable of restricting the motion of the anionically stabilized susceptor material at or near the edge boundary 39, thus preventing sintering or fusing of the portion 36 of the ceramic build material 12. In contrast, the liquid functional material 28 is capable of enhancing sintering or fusing of the portion 34 of the ceramic build material 12.

The detailing agent fluid 26 and the liquid functional material 28 may be applied in any suitable manner that will result in mixing of the fluids 26, 28 before the liquid functional material 28 has migrated out of the patterned portion 34. In an example, the detailing agent fluid 26 may be applied before the liquid functional material 28 is applied. In another example, the detailing agent fluid 26 may be applied at the same time that the liquid functional material 28 is applied, using a single printing pass or using multiple printing passes. In other words, the detailing agent fluid 26 and the liquid functional material 28 may be applied simultaneously.

As depicted in FIG. 1B, the detailing agent fluid 26 and the liquid functional material 28 may be dispensed from respective applicators 30, 32. While not shown, the detailing agent fluid 26 and the liquid functional material 28 may also be dispensed from a single applicator, having a first set of nozzles (or other delivery mechanism) configured to deliver the detailing agent fluid 26, and a second set of nozzles (or other delivery mechanism) configured to deliver the liquid functional material 28.

The applicators 30, 32 may be inkjet applicators. Examples of suitable inkjet applicators include a thermal inkjet printhead or a piezoelectric inkjet printhead. The printhead may be a drop-on-demand printhead or a continuous drop printhead. The applicators 30, 32 may deliver drops of the detailing agent fluid 26 and the liquid functional material 28 at a resolution ranging from about 300 dots per inch (DPI) to about 1200 DPI. In other examples, the applicators 30, 32 may be able to deliver drops of the detailing agent fluid 26 and the liquid functional material 28 at a higher or lower resolution. The drop velocity may range from about 5 m/s to about 24 m/s and the firing frequency may range from about 1 kHz to about 100 kHz. The applicators 30, 32 may include an array of nozzles through which it is able to selectively eject drops of the respective fluids 26, 28. In one example, each drop may be in the order of about 10 pico liters (pl) per drop, although it is contemplated that a higher or lower drop size may be used. In some examples, applicators 30, 32 are able to deliver variable size drops of the respective fluids 26, 28.

The applicators 30, 32 may be attached to a moving XY stage or a translational carriage (neither of which is shown) that moves the applicators 30, 32 adjacent to the build material 12 in order to deposit the respective fluids 26, 28 in desirable portions(s) 36, 34. In other examples, the applicators 30, 32 may be fixed while a support member (supporting the build material 12) is configured to move relative thereto. The applicators 30, 32 may be programmed to receive commands from a central processing unit and to deposit the respective fluids 26, 28 according to a pattern of a particular layer of the 3D object 42.

In an example, the applicators 30, 32 may have a length that enables it to span the whole width of the member (e.g., the fabrication bed 22) supporting the build material 12 in a page-wide array configuration. As used herein, the term 'width' generally denotes the shortest dimension in the plane parallel to the X and Y axes of the support member, and the term 'length' denotes the longest dimension in this plane. However, it is to be understood that in other examples the term 'width' may be interchangeable with the term 'length'.

In an example, the page-wide array configuration is achieved through a suitable arrangement of multiple applicators 30, 32. In another example, the page-wide array configuration is achieved through a single applicator 30 or 32. In this other example, the single applicator 30 or 32 may include an array of nozzles (some of which dispense the detailing agent fluid 26 and others of which dispense the liquid functional material 28) having a length to enable them to span the width of the support member. This configuration may be desirable for single pass printing. In still other examples, the applicators 30, 32 may have a shorter length that does not enable them to span the whole width of the support member. In these other examples, the applicators 30, 32 may be movable bi-directionally across the width of the support member. This configuration enables selective delivery of the respective fluids 26, 28 across the whole width and length of the support member using multiple passes.

In some examples, after the detailing agent fluid 26 and liquid functional material 28 are selectively applied in the desired portions 36 and/or 34, the entire layer 14 of the ceramic build material 12 may be exposed to microwave radiation or RF radiation. This is shown at FIG. 1C.

Microwave or RF radiation exposure may be accomplished using any microwave or RF radiation source 40. Examples of the microwave or RF radiation source 40 include a microwave or RF furnace, microwave or RF generators, radars, or the like. The microwave or RF radiation used may have a frequency ranging from about 5 kHz to about 300 GHz.

The length of time the energy is applied for, or energy exposure time, may be dependent, for example, on one or more of: characteristics of the radiation source 40; characteristics of the build material 12; and/or characteristics of the liquid functional material 28.

The liquid functional material 28 (and in particular, the anionically stabilized susceptor material) enhance(s) the absorption of the microwave or RF radiation, convert(s) the absorbed microwave or RF radiation to thermal energy, and promote(s) the transfer of the thermal heat to the ceramic build material 12 in contact therewith (i.e., in the portion(s) 34). In an example, the liquid functional material 28 sufficiently elevate(s) the temperature of the ceramic build material 12, allowing fusing or sintering of the ceramic build material particles 12 in contact with the liquid functional material 28 to take place. In an example, the liquid functional material 28 is able to absorb and transfer to the ceramic build material 12 in contact therewith enough thermal energy to heat the build material 12 to a temperature ranging from about 200° to about 2500° C. In an example, the temperature is elevated about 50° C. above the melting temperature of the ceramic build material 12. In another example, the liquid functional material 28 may cause heating of the ceramic build material 12 below its melting point, but to a temperature suitable to cause sintering and bonding (e.g., to a temperature ranging from about 40% to about 90% of the melting point of the ceramic build material 12). It is to be understood that portions 36 of the ceramic build material 12 that do not have the liquid functional material 28 applied thereto do not absorb enough energy to fuse or sinter. Exposure to microwave or RF radiation forms the 3D object 42 (or one layer L of a 3D object), as shown at FIG. 1C.

Several examples of the method are shown in FIGS. 1A through 1C. One example of the method involves performing the processes at FIGS. 1A through 1C sequentially to form a single layer 3D object 42. Another example of the method 100 involves repeating the processes at FIGS. 1A and 1B to form a green body (with multiple layers 14, each of which has detailing agent fluid 26 and liquid functional material 28 thereon) before exposing the green body to microwave or RF radiation to form the 3D object 42 (i.e., before performing the process at FIG. 1C). Still another example of the method 200 is a layer by layer process. The layer by layer process involves exposing the layer 14 (having detailing agent fluid 26 and liquid functional material 28 thereon) to microwave or RF radiation to form a solidified layer L of a 3D object that is to be formed, before forming any additional layers of the 3D object.

In the example of the method 100, the green body may be formed before exposure to microwave or RF radiation. A single layered green body (i.e., layer 14 having both detailing agent fluid 26 and liquid functional material 28 applied thereto) is shown in FIG. 1B. In this example, the detailing agent fluid 26 is applied to define a perimeter of the single layered green body. It is to be understood that the green body (and thus the resulting 3D object 42) may be built up to include several layers. Each additional layer of the green body may be formed by repeating FIGS. 1A and 1B. For example, to form an additional layer of the green body, an additional layer of the ceramic build material 12 may be applied to the layer 14 (having both detailing agent fluid 26 and liquid functional material 28 applied thereto), and the additional layer may have the detailing agent fluid 26 and the liquid functional material 28 selectively applied thereto. Any number of additional layers may be formed by repeating FIGS. 1A and 1B. Once the desirable number of layers is formed, the green body is complete and may be exposed to microwave or RF radiation (FIG. 1C).

The formation of the green body prior to microwave or RF radiation exposure (i.e., method 100) may suitable for certain ceramic build materials 12. For example, the formation of the green body prior to microwave or RF radiation exposure may be used for the ceramic build materials having higher melting points. The thermal stress associated with fusing layer by layer (as shown at reference numeral 200) may be too high for ceramics with high melting points.

When the method 100 is utilized, the green body may be removed from the fabrication bed 22 and placed in or within proximity of a suitable microwave or RF radiation source 40 for microwave or RF radiation exposure. Alternatively, the green body may remain in the fabrication bed 22 and be exposed to microwave or RF radiation. With the method 100, several heating stages may be used, e.g., an initial, lower temperature heating to densify the green body, followed by higher temperature sintering.

In the example of the method 200, sequentially performing the processes at FIGS. 1A, 1B and 1C forms one layer L of the 3D object 42. In this example of the method 200, each of the processes at FIGS. 1A, 1B, and 1C may be repeated to form additional layers, and ultimately the 3D object 42. For example, to form an additional layer of the 3D object 42, an additional layer of the ceramic build material 12 may be applied to the layer L shown in FIG. 1C, the additional layer may have detailing agent fluid 26 and the liquid functional material 28 selectively applied thereto, and the additional layer may be exposed to microwave or RF radiation. Any number of additional layers may be formed in this manner.

The layer by layer method (i.e., method 200) may also be suitable for certain ceramic build materials 12. Whether a ceramic build material 12 may be used in the layer by layer method may depend upon the melting point of the material 12, the ambient temperature in the print region, and the ability of the material 12 to endure thermal shock. For example, the method 200 may be used for ceramic materials with lower melting points (e.g., soda-lime glass, glass frit, etc.). As an example, a lower melting point may be 700° C. or lower. When the method 200 is utilized, the layers of the 3D object 42 may remain in the fabrication bed 22 and the microwave or RF radiation source 40 may be positioned within proximity of the fabrication bed 22. When the method 200 is utilized and the 3D object 42 is complete, it may be removed from the fabrication bed 22, and any uncured ceramic build material 12 may be washed away.

The examples of the method shown in FIGS. 1A through 1C may also be used for increasing a solids load within a patterned area (e.g., area 34') of a build material 12'. In these examples of the method (labeled 100' and 200'), the use of the detailing agent fluid 26 may or may not improve the edge acuity and overall dimensional accuracy of the 3D object 42, but it will increase a solids load within the patterned area 34' by preventing spreading of an anionically stabilized material dispensed within the patterned area 34'.

In each of the examples of the method 100' and 200', a build material 12' is applied using the system 10 in a similar manner to that previously described. In these examples, the build material 12' may be any of the previously listed ceramic build materials 12, a polymeric build material, or a composite material of polymer and ceramic.

Examples of polymeric build material include semi-crystalline thermoplastic materials with a wide processing window of greater than 5° C. (i.e., the temperature range between the melting point and the re-crystallization temperature). Some specific examples of the polymeric build material include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other specific examples of the polymeric build material 12' include polyethylene, polyethylene terephthalate (PET), and an amorphous variation of these materials. Still other examples of suitable polymeric build materials include polystyrenes, polyacetals, polypropylene, polycarbonates, polyester, thermal polyurethanes, fluoropolymers, other engineering plastics, and blends of any two or more of the polymers listed herein. Core shell polymer particles of these materials may also be used.

Any of the previously listed polymeric build materials may be combined with any of the previously listed ceramic build materials 12 to form the composite build material. The amount of polymeric build material that may be combined with the ceramic build material 12 may depend on the polymeric build material used, the ceramic particles used, and the 3D part 42 to be formed.

In these examples, the build material 12' may have a melting point ranging from about 60° C. to about 2800° C. As examples, the build material 12' may be a polyamide having a melting point of 180° C., a thermal polyurethane having a melting point ranging from about 100° C. to about 165° C., or a metal oxide having a melting point ranging from about 1000° C. to about 2800° C.

In each of the examples of the method 100' and 200', after the build material 12' is applied, the detailing agent fluid 26 and a liquid functional material 29 are respectively and selectively applied, as shown at FIG. 1B. The detailing agent fluid 26 previously described herein may be applied outside of the edge boundary 39 of where the liquid functional material 29 is (to be) selectively applied onto the build material 12'. The liquid functional material 29 may be selectively applied onto the build material 12' at the patterned area 34' (e.g., inside of the edge boundary 39), where it is desirable to increase the solids load.

The liquid functional material 29 has a similar formulation to the liquid functional material 28 (e.g., water, co-solvent(s), surfactant(s), etc.), except that the liquid functional material 29 includes an anionically stabilized material instead of the anionically stabilized susceptor material (which, as previously described, may have a loss tangent of >0.01 at a frequency of the energy delivered applied during 3D printing). The anionically stabilized material may have high absorptivity of microwave radiation (like examples of the anionically stabilized susceptor material) and/or may have high absorptivity of electromagnetic radiation other than microwave, such as ultraviolet (UV) radiation, infrared (IR) radiation, radio frequency (RF) radiation, visible radiation, etc. These anionically stabilized materials may contribute to heating the build material 12' in contact therewith when exposed to the appropriate radiation. In some instances, the anionically stabilized material functions to lower the fusing temperature of the build material 12' (i.e., is a fusing aid) rather than as an absorber of the applied radiation. An example of this anionically stabilized material is $SiO_2$, which, in an aqueous environment having a neutral to basic pH, carries negative charges at the surface. Still other examples of the anionically stabilized material may not have high absorptivity of any radiation, and thus may not contribute to heating the build material 12' in contact therewith. For example, the anionically stabilized material may be an anionically stabilized pigment that is used to color a 3D object 42 (e.g., a dispersion of $Fe_2O_3$), but may not be used as an absorber or a fusing aid.

The anionically stabilized material in the liquid functional material 29 includes negatively charged groups and/or species bonded, absorbed, or otherwise attached to the surface thereof, which render the anionically stabilized material reactive by means of electrostatic attraction with the cationic polymer in the detailing agent fluid 26 when the fluids 26, 29 come into contact with one another.

The anionically stabilized material may be present in the liquid functional material 29 in an amount ranging from about 1 wt % to about 60 wt % based upon the total wt % of the in the liquid functional material 29.

In the example of the method 100', a green body may be formed before exposure to radiation (FIG. 1C) by repeating FIGS. 1A and 1B with build material 12' and the detailing agent fluid 26 and the liquid functional material 29. For example, to form an additional layer of the green body, an additional layer of the build material 12' may be applied to the layer 14 (having both detailing agent fluid 26 and liquid functional material 29 applied thereto), and the additional layer may have the detailing agent fluid 26 and the liquid functional material 29 selectively applied thereto. Any number of additional layers may be formed by repeating FIGS. 1A and 1B. Once the desirable number of layers is formed, the green body is complete and may be exposed to radiation (FIG. 1C).

The formation of the green body prior to radiation or thermal energy exposure (i.e., method 100') may be suitable for polymer build materials, certain ceramic build materials 12, and certain composite build materials. For example, the formation of the green body prior to radiation exposure may be used for the ceramic build materials having higher melting points. The thermal stress associated with fusing layer by layer (as shown at reference numeral 200') may be too high for ceramics with high melting points.

The radiation used in the method 100' may be microwave or RF radiation when the liquid functional material 29 is a susceptor (e.g., has high absorptivity of microwave radiation and/or radio frequency (RF) radiation). Radiation with wavelengths shorter than microwave radiation and with frequencies higher than microwave radiation may not be suitable for the method 100' because the radiation may not be able to penetrate the volume of material in the green body. However, the radiation used in the method 100' may be thermal energy, for example, when the liquid functional material 29 is capable of enhancing fusing of the green body at elevated temperatures (i.e., acts as a fusing aid) or is capable of modifying local material properties.

In the example of the method 200', one layer L of the 3D object may be formed by exposing the build material 12' having the detailing agent fluid 26 and the liquid functional material 29 thereon to radiation or thermal energy.

For the layer by layer method 200', it is to be understood that any form of radiation or thermal energy may be used. Electromagnetic radiation with wavelengths shorter than microwave radiation and with frequencies higher than microwave radiation may be particularly desirable for the layer by layer method 200'. When the anionically stabilized material in the liquid functional material 29 has high absorptivity of a particular radiation, that radiation may be selected to heat the build material 12'. For example, if the anionically stabilized material in the liquid functional material 29 has high absorptivity of UV, IR, or visible radiation, the radiation source 40' selected may be a UV, IR or near-IR curing lamp, or UV, IR or near-IR light emitting diodes (LED), or lasers with specific UV, IR or near-IR wavelengths, or visible light sources. In these examples, the anionically stabilized material in the liquid functional material 29 enhances the absorption of the radiation, converts the absorbed radiation to thermal energy, and promotes the transfer of the thermal heat to the build material 12' in contact therewith (i.e., in the patterned portion 34'). In these examples, the anionically stabilized material in the liquid functional material 29 sufficiently elevates the temperature of the build material 12' in the portion 34' to a percentage of the melting point or above the melting point(s), allowing sintering or fusing of the build material particle 12' to take place.

When the anionically stabilized material in the liquid functional material 29 does not have high absorptivity of a particular radiation and/or is a fusing aid, thermal energy may be selected to heat the build material 12'. In these examples, the thermal energy may be selectively applied to sufficiently elevate the temperature of the build material 12' in the portion 34' to a percentage of the melting point or above the melting point(s), allowing sintering or fusing of the build material particle 12' to take place.

In this example of the method 200', each of the processes at FIGS. 1A, 1B, and 1C may be repeated to form additional layers, and ultimately the 3D object 42. For example, to form an additional layer of the 3D object 42, an additional layer of the build material 12' may be applied to the layer L shown in FIG. 1C, the additional layer may have detailing agent fluid 26 and the liquid functional material 29 selectively applied thereto, and the additional layer may be exposed to radiation or thermal energy. Any number of additional layers may be formed in this manner.

The layer by layer method (i.e., method 200') may also be suitable for certain build materials 12'. For example, the method 200' may be used for polymer build material, ceramic build materials 12 with lower melting points (e.g., soda-lime glass, glass frit, etc.), and certain composite build materials.

Referring now to FIGS. 4A through 4D, another example of the 3D printing method is depicted. In this example, an initial layer 44 of the ceramic build material 12 is applied to the fabrication bed 22. The initial layer 44 may be applied as previously described in reference to FIG. 1A and the layer 14 of the ceramic build material 12.

Figure 4A:
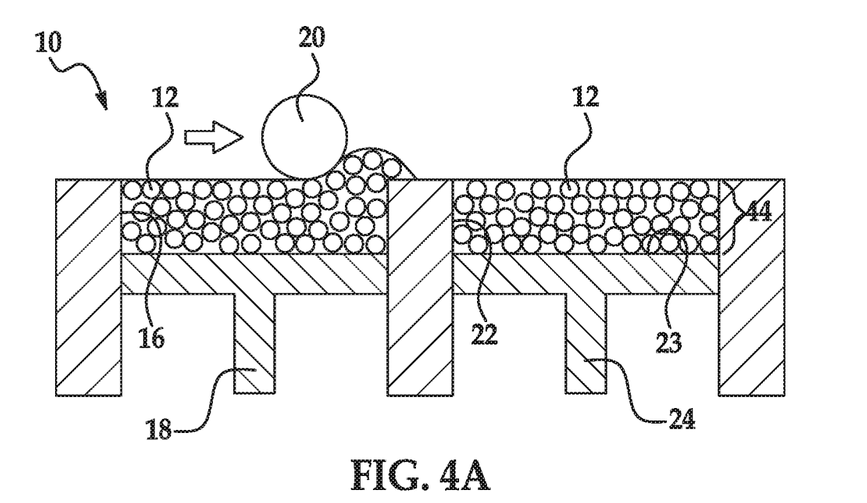
FIGS. 4A through 4D are schematic cross-sectional views depicting the formation of layer(s) of a 3D object using an example of a 3D printing method disclosed herein.
Figure 4B:
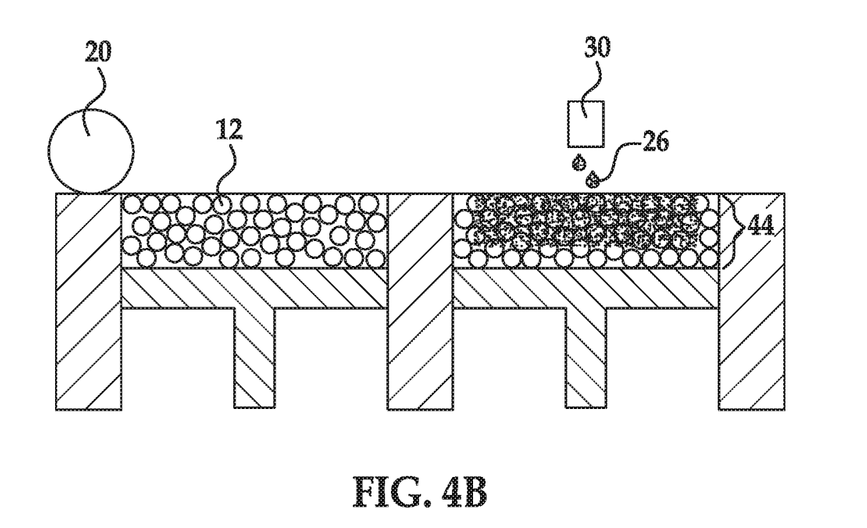
Figure 4C:
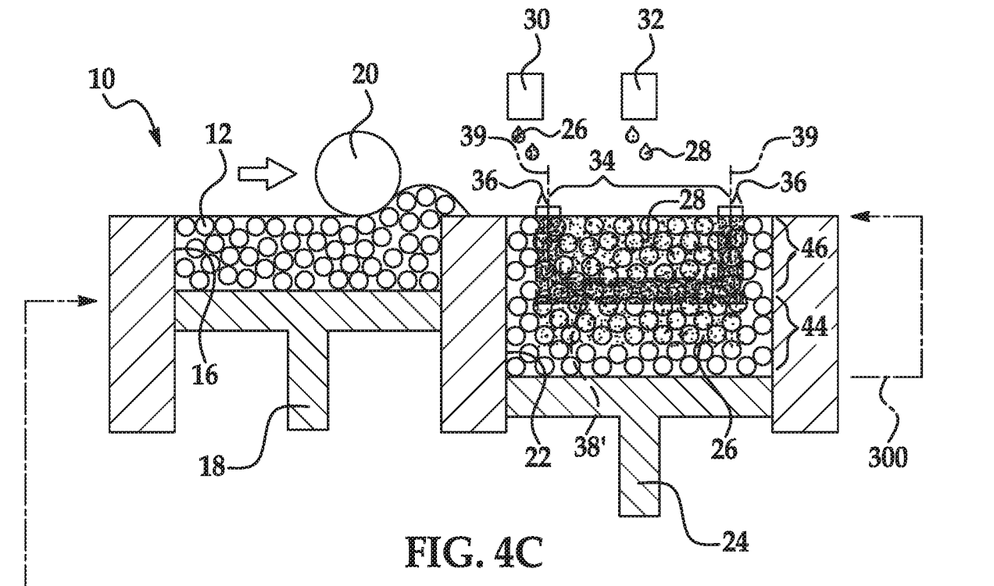

In this example of the method, the detailing agent fluid 26 is applied to at least some of the ceramic build material 12 in the initial layer 44. The detailing agent fluid 26 may be applied to any of the ceramic build material 12 in the initial layer 44 that will be adjacent to ceramic build material 12 in a subsequently formed layer 46 (FIG. 4C). More particularly, the detailing agent fluid 26 may be applied to any of the ceramic build material 12 in the initial layer 44 that may come into contact with liquid functional material 28 that is applied to a subsequently formed layer 46. When the liquid functional material 28 is applied to at least a portion 34 of the ceramic build material 12 in the subsequently formed layer 46, the cationic polymer in the detailing agent fluid 26 in the initial layer 44 reacts with the anionically stabilized susceptor material in the liquid functional material 28 to prevent the migration of the anionically stabilized susceptor material throughout the ceramic build material 12 in the initial layer 44. This reaction stabilizes the ceramic build material 12 and the anionically stabilized susceptor material at the perimeter of the first layer of the 3D object 42' to be formed.

The detailing agent fluid 26 may be applied to at least some of the build material 12 in the initial layer 44 via the applicator 30.

Referring now to FIG. 4C, two additional processes are shown, namely the formation of the layer 46 of ceramic build material 12 on the initial layer 44, and the application of the detailing agent fluid 26 and the liquid functional material 28 to the layer 46.

In this example, the layer 46 of the ceramic build material 12 is applied to the initial layer 44 in the fabrication bed 22. The layer 46 may be applied as previously described.

Also in this example, the detailing agent fluid 26 and the liquid functional material 28 are applied to different portion(s) 36, 34 of the ceramic build material 12 in the layer 46. As depicted, the detailing agent fluid 26 may be selectively applied outside of the edge boundary 39 of where the liquid functional material 28 is (to be) selectively applied onto the ceramic build material 12. While not shown, the detailing agent fluid may also or alternatively be applied at any areas of the ceramic build material 12 where holes, slots, or other apertures are to be defined in the 3D object 42'.

At certain portion(s) 38' of the ceramic build material 12, the detailing agent fluid 26 and the liquid functional material 28 come into contact with each other. In this example, the portions 38' include area(s) at or near the edge boundary 39 as well as areas where the initial layer 44 and the layer 46 contact each other. At these portion(s) 38' and when the fluids 26, 28 contact each other, the cationic polymer in the detailing agent fluid 26 precipitates the anionically stabilized susceptor material out of the liquid functional material 28, which restricts the motion (i.e., prevents spreading) of the anionically stabilized susceptor material. As previously mentioned, the interaction of the cationic polymer and the anionically stabilized susceptor material at the areas where the initial layer 44 and the layer 46 contact each other may stabilize the ceramic build material 12 at this area.

After the detailing agent fluid 26 and liquid functional material 28 are selectively applied in the desired portions 36 and/or 34, the entire layer 46 and the portion 38' including the stabilized build material 12 from the initial layer 44 may be exposed to microwave or RF radiation. This is shown at FIG. 40. Microwave or RF radiation exposure may be accomplished as previously described.

Figure 4D:
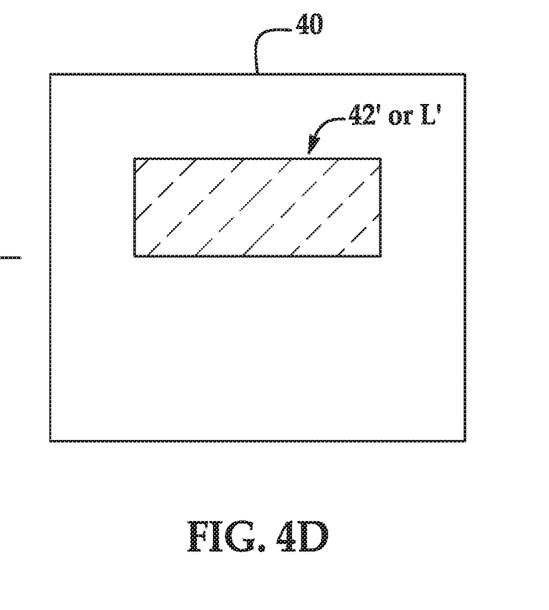

The liquid functional material 28 (and in particular, the anionically stabilized susceptor material) enhance(s) the absorption of the microwave or RF radiation, convert(s) the absorbed microwave or RF radiation to thermal energy, and promote(s) the transfer of the thermal heat to the build material 12 in contact therewith (i.e., in the portion(s) 34). Exposure to microwave or RF radiation forms the 3D object 42' (or one layer L' of a 3D object), as shown at FIG. 4D.

Several examples of the method are shown in FIGS. 4A through 4D. One example of the method involves performing the processes at FIGS. 4A through 4D sequentially to form a single layer 3D object 42'. Another example of the method 300 involves repeating the processes at FIG. 4C to form a green body (with multiple layers 46, each of which has detailing agent fluid 26 and liquid functional material 28 thereon) before exposing the green body to microwave radiation to form the 3D object 42' (i.e., before performing the process at FIG. 40). Still another example of the method 400 is a layer by layer process. The layer by layer process involves exposing layers 46 and 44 to microwave radiation or thermal energy to form a solidified layer L' of a 3D object that is to be formed, before forming any additional layers of the 3D object.

In the example of the method 300, the green body may be formed before exposure to microwave radiation. A single layered green body (i.e., layer 46 having both detailing agent fluid 26 and liquid functional material 28 applied thereto and the portion 38' including the stabilized build material 12 from the initial layer 44) is shown in FIG. 4C. It is to be understood that the green body (and thus the resulting 3D object 42') may be built up to include several layers. Each additional layer of the green body may be formed by repeating the application of build material 12, detailing agent fluid 26 and liquid functional material 28 of FIG. 4C. For example, to form an additional layer of the green body, an additional layer of the build material 12 may be applied to the layer 46 (having both detailing agent fluid 26 and liquid functional material 28 applied thereto), and the additional layer may have the detailing agent fluid 26 and the liquid functional material 28 selectively applied thereto. Any number of additional layers may be formed by repeating FIG. 4C. Once the desirable number of layers is formed, the green body is complete and may be exposed to microwave or RF radiation (FIG. 4D).

The formation of the green body prior to microwave or RF radiation exposure (i.e., method 300) may suitable for certain build materials 12. For example, the formation of the green body may be used for the ceramic build materials having higher melting points. The thermal stress associated with fusing layer by layer (as shown at reference numeral 400) may be too high for ceramics with high melting points, and thus these materials are used with the method 300.

When the method 300 is utilized, the green body may be removed from the fabrication bed 22 and placed in or within proximity of a suitable microwave radiation source 40 or thermal energy source for exposure. Alternatively, the green body may remain in the fabrication bed and exposed to microwave or RF radiation. With the method 300, several heating stages may be used, e.g., an initial, lower temperature heating to cure the green body (e.g., render the green body mechanically stable enough to be extracted from the fabrication bed 22), followed by higher temperature sintering (e.g., to achieve final densification and material properties).

In the example of the method 400, sequentially performing the processes at FIGS. 4A, 4B, 4C, and 4D forms one layer L' of the 3D object 42'. In this example of the method 400, the processes at FIGS. 4C and 4D may be repeated to form additional layers, and ultimately the 3D object 42'. For example, to form an additional layer of the 3D object 42', an additional layer of the build material 12 may be applied to the layer L' shown in FIG. 4D, the additional layer may have detailing agent fluid 26 and the liquid functional material 28 selectively applied thereto, and the additional layer may be exposed to microwave or RF radiation. Any number of additional layers may be formed in this manner.

The layer by layer method (i.e., method 400) may also be suitable for certain build materials 12. For example, the method 400 may be used for ceramic materials with lower melting points (e.g., soda-lime glass, glass frit, etc.). When the method 400 is utilized, the layers of the 3D object 42' may remain in the fabrication bed 22 and the microwave or RF radiation source 40 may be positioned within proximity of the fabrication bed 22. When the method 400 is utilized and the 3D object 42' is complete, it may be removed from the fabrication bed 22, and any uncured build material 12 may be removed.

The various examples of the method disclosed herein enable a high solids content to be delivered to desirable portion(s) of the build material 12 or 12' by maintaining the anionically stabilized susceptor material or the anionically stabilized material in those portion(s). Additionally, by keeping the anionically stabilized susceptor material and some examples of the anionically stabilized material in the areas that are to be fused or sintered, the edge acuity and overall dimensional accuracy of the 3D object that is formed may be improved.

In any of the examples disclosed herein, a second liquid functional material may be used in combination with the liquid functional material 28 or 29. The second liquid functional material may be a fusing aid, which functions to lower the temperature at which the build material 12 or 12' fuses. An example of the second liquid functional material is an aqueous dispersion of silica ($SiO_2$) particles. Whenever a fusing aid is used in the examples disclosed herein, thermal energy may be used during the fusing operation.

To further illustrate the present disclosure, an example is given herein. It is to be understood that this example is provided for illustrative purposes and is not to be construed as limiting the scope of the present disclosure.

EXAMPLE

A detailing agent fluid was prepared with the composition shown in Table 1.

TABLE 1

| Ingredient | Specific component | Actives Wt % | Target Wt % | Formulation Wt % |
|---|---|---|---|---|
| Co-solvent | 2-pyrrolidone | 100 | 16.00 | 16.00 |
| Surfactant | TERGITOL ® 15-S-7 | 50 | 2.5 | 5.00 |
| Cationic Polymer | FLOQUAT ® FL 2350 | 100 | 0.40 | 0.40 |
| Water | | | | 78.60 |

A liquid functional material (including a complex ferrite of iron, cobalt and manganese oxides) was utilized. The composition of the liquid functional material is shown in Table 2.

TABLE 2

| Ingredient | Specific component | Formulation Wt % |
|---|---|---|
| Co-solvents | 2-pyrrolidone | 10.00 |
|  | DANTOCOL ® DHE | 10.00 |
| Surfactant | SURFYNOL ® 465 | 0.20 |
| Anionically stabilized susceptor material | Proprietary Co—Mn—Ferrite | 30.00 |
| Biocide | PROXEL ® DXL | 0.05 |
| Water |  | Balance |

This example was performed to characterize the spreading of the liquid functional material with and without the detailing agent. The liquid functional material, and in some instances the detailing agent, were dispensed as described below in a gear pattern GP (shown in FIG. 5) on unfused powder beds composed of AA-18 alumina powder (available from Sumitomo) as the build material. Measurements of various features of the patterned (but not fused) build material were taken after the material(s) were dispensed. Control of the liquid functional material spread in the unfused powder bed is a first step in being able to properly define a fused 3D printed object.

Figure 5:
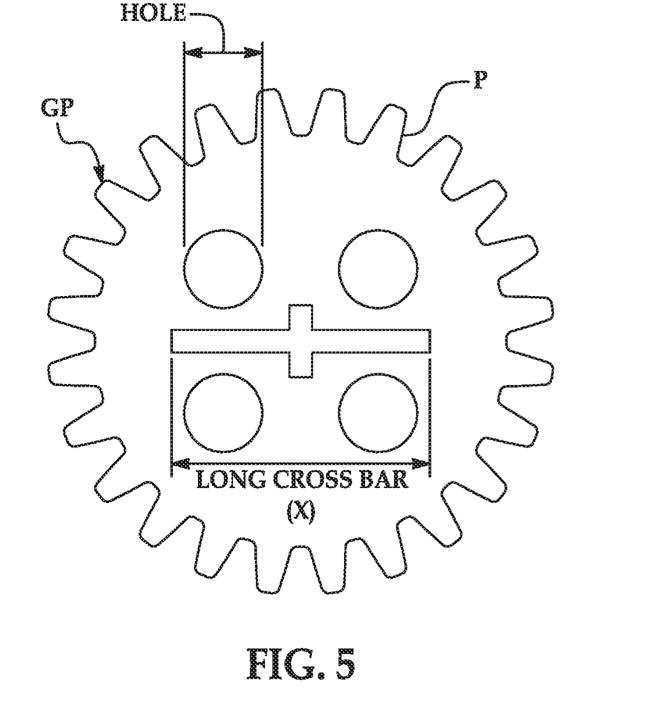
FIG. 5 is a schematic view of a pattern, having several features, for example and comparative parts to be formed with and without an example of the detailing agent fluid disclosed herein.

Example printed build materials and comparative printed build materials were prepared according to the gear pattern GP shown in FIG. 5.

For Example printed build material 1, the detailing agent fluid was applied in a single pass (2 12 ng drops of fluid applied per pixel area with dimension 1/600×1/600 inch (about 13.5 g of fluid per m² (gsm))) along the perimeter P of the gear pattern GP, at the areas where the holes were to be formed, and at the area where the cross bar was to be formed, and the liquid functional material was applied in 10 passes (for each pass, 2 12 ng drops of fluid applied per pixel area with dimension 1/600×1/600 inch (about 13.5 g of fluid per m² (gsm))) in the gear pattern GP. For Example printed build material 2, the detailing agent fluid was applied in two passes (for each pass, 2 12 ng drops of fluid applied per pixel area with dimension 1/600×1/600 inch (about 13.5 g of fluid per m² (gsm))) along the perimeter P of the gear pattern GP, at the areas where the holes were to be formed, and at the area where the cross bar was to be formed, and the liquid functional material was applied in 10 passes (for each pass, 2 12 ng drops of fluid applied per pixel area with dimension 1/600×1/600 inch (about 13.5 g of fluid per m² (gsm))) in the gear pattern GP.

For Comparative Example printed build material 1 (which was a baseline for this experiment), the detailing agent fluid was not utilized, and the liquid functional material was applied in 1 pass (2 12 ng drops of fluid applied per pixel area with dimension 1/600×1/600 inch (about 13.5 g of fluid per m² (gsm))) in the gear pattern GP. The amount of liquid functional material used in this comparative example was not sufficient to cause significant spread beyond the defined edge of the printed part. This allowed for characterization of the printed pattern with a minimal amount of liquid functional material to establish what the best definition of the printed pattern could be. For Comparative Example printed build material 2, the detailing agent fluid was not utilized, and the liquid functional material was applied in 10 passes (for each pass, 2 12 ng drops of fluid applied per pixel area with dimension 1/600×1/600 inch (about 13.5 g of fluid per m² (gsm))) in the gear pattern GP.

Figure 6:
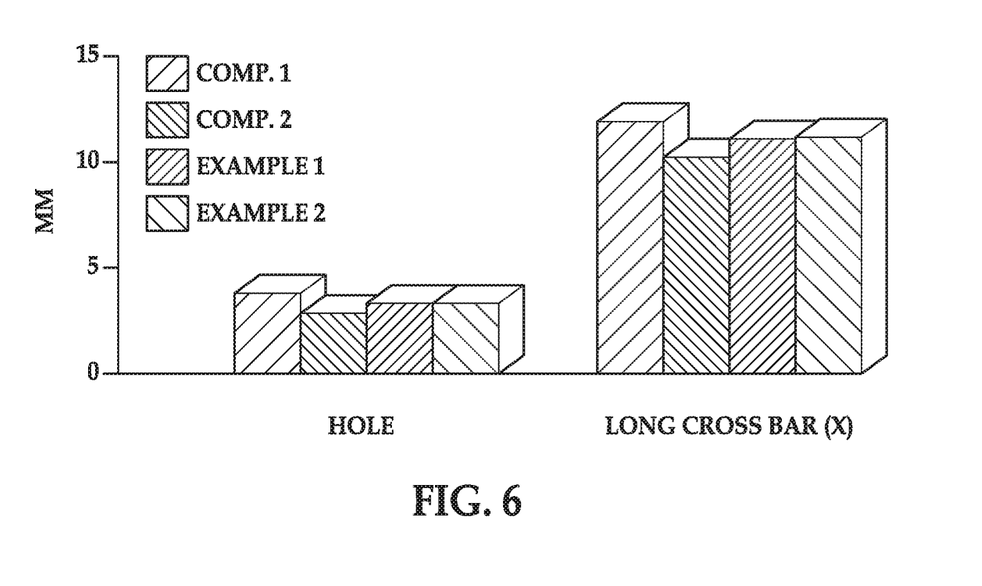
FIG. 6 is a graph depicting the measurement of features of the example and comparative parts formed with and without the example of the detailing agent fluid disclosed herein.

After the respective printed build materials were formed (but not fused), the dimensions of the holes and the long cross bar (X) were measured. These results are illustrated in FIG. 6. As depicted, when the detailing agent fluid was not utilized, the hole and the length of the long cross bar were well defined when a low dose of liquid functional material was provided (Comparative Example printed build material 1) or decreased significantly relative to the desired pattern when a high liquid functional material dose was provided (Comparative printed build material Example 2). When the detailing agent fluid was utilized, the feature dimensions were consistent and better defined, while also enabling the desired high liquid functional material loading into the part.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 10 µm to about 500 µm should be interpreted to include the explicitly recited limits of 10 µm to 500 µm, as well as individual values, such as 50 µm, 125 µm, 300.5 µm, 495 µm, etc., and sub-ranges, such as from about 35 µm to about 375 µm, from about 60 µm to about 225 µm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
applying a ceramic build material;
applying a detailing agent fluid to a portion of the ceramic build material that is outside a pattern of a 3D object being patterned, thereby defining a perimeter of a first layer of the 3D object, the detailing agent including a cationic polymer; and
applying a liquid functional material, including an anionically stabilized susceptor material, to another portion of the ceramic build material that is within the pattern of the 3D object being patterned, such that at least some of the anionically stabilized susceptor material reacts with at least some of the cationic polymer at an edge boundary of the pattern, thereby preventing spreading of the anionically stabilized susceptor material outside the pattern and preventing sintering or fusing of ceramic build material outside the pattern;
wherein the detailing agent fluid and the liquid functional material are applied in a single printing pass.

2. The 3D printing method as defined in claim 1, wherein:
prior to the application of the ceramic build material, the method further comprises:
applying an initial layer of the ceramic build material; and
applying the detailing agent fluid on at least a portion of the initial layer, thereby stabilizing the initial layer; and
the ceramic build material is applied to the initial layer.

3. The 3D printing method as defined in claim 1 wherein the application of the ceramic build material, the detailing agent fluid, and the liquid functional material forms a first layer of a green body, and wherein the detailing agent fluid is applied to define a perimeter of the first layer.

4. The 3D printing method as defined in claim 1 wherein the application of the ceramic build material, the detailing agent fluid, and the liquid functional material forms a first layer of a green body, and wherein the method further comprises heating the green body using microwave or radio frequency (RF) radiation, thereby sintering the ceramic build material of the green body to form a part.

5. The 3D printing method as defined in claim 1 wherein the application of the ceramic build material, the detailing agent fluid, and the liquid functional material forms a first layer of a green body, and wherein the method further comprises forming a second layer of the green body by:
  applying additional ceramic build material to the first layer of the green body;
  applying the detailing agent fluid to a portion of the additional ceramic build material; and
  applying the liquid functional material to another portion of the additional ceramic build material that is in contact with the portion of the additional ceramic build material having the detailing agent fluid thereon, such that at least some of the anionically stabilized susceptor material reacts with at least some of the cationic polymer, thereby preventing spreading of the anionically stabilized susceptor material.

6. The 3D printing method as defined in claim 5, further comprising forming subsequent layers of the green body by repeating the application of the ceramic build material, the detailing agent fluid, and the liquid functional material in each subsequent layer, wherein the detailing agent is applied outside the pattern of the 3D object being patterned in each of the subsequent layers and wherein the liquid functional material is applied within the pattern of the 3D object being patterned in each of the subsequent layers.

7. The 3D printing method as defined in claim 6, further comprising heating the green body using microwave or RF radiation, thereby sintering the ceramic build material of the green body to form a part.

8. The 3D printing method as defined in claim 1 wherein molecules of the cationic polymer have positively charged groups, and wherein the cationic polymer is selected from the group consisting of cationic polyamines, polymers including guanidinium functionalities, polymers including fully quaternized ammonium functionalities, polyethylene imine, and combinations thereof.

9. The 3D printing method as defined in claim 1 wherein the anionically stabilized susceptor material is selected from the group consisting of a carbon black particle having negatively charged groups at a surface of the carbon black particle, a carbon black particle having a negatively charged polymeric dispersant absorbed to a surface thereof, a ferromagnetic metal oxide particle having an anionic dispersing species absorbed to a surface thereof, a semiconductor or conductive oxide particle having an anionic dispersing species absorbed to a surface thereof, and combinations thereof.

10. The 3D printing method as defined in claim 9 wherein:
  the ferromagnetic metal oxide particle is selected from the group consisting of $Fe_3O_4$, a complex ferrite, and combinations thereof; and
  the anionic dispersing species absorbed to the surface of the ferromagnetic metal oxide particle is selected from the group consisting of multi-carboxylic organic acids, phosphate ions, and water-soluble polymers containing carboxylic groups or sulfo groups.

11. The 3D printing method as defined in claim 1 wherein the anionically stabilized susceptor material comprises complex ferrite $Fe_2O_3/CoO/Mn_2O_3$ particles.

12. The 3D printing method as defined in claim 1, further comprising defining an aperture in the pattern of the 3D object being patterned by selectively applying the detailing agent fluid in an area where the liquid functional agent is absent, wherein the area is surrounded by the other portion of the ceramic build material that is patterned with the liquid functional agent, and wherein at least some of the anionically stabilized susceptor material outside the area reacts with at least some of the cationic polymer at an edge of the area, thereby preventing spreading of the anionically stabilized susceptor material into the area.

13. The 3D printing method as defined in claim 12 wherein the aperture is a hole or a slot.

14. A method for increasing a solids load within a patterned area of a build material, the method comprising:
  applying the build material;
  applying a detailing agent fluid to a portion of the build material that is outside the patterned area, the detailing agent including a cationic polymer; and
  applying a liquid functional material, including an anionically stabilized material, to another portion of the build material that is within the patterned area, such that at least some of the anionically stabilized material in the patterned area reacts with at least some of the cationic polymer at an edge boundary of the patterned area, thereby preventing spreading of the anionically stabilized material outside the patterned area and preventing sintering or fusing of ceramic build material outside the patterned area;
  wherein the detailing agent fluid and the liquid functional material are applied in a single printing pass.

15. The method as defined in claim 14, wherein:
  the build material is selected from the group consisting of polymers, ceramics, or composites of polymer and ceramics; and
  the method further comprises heating at least the patterned area using electromagnetic radiation or thermal energy, thereby fusing the build material in at least the patterned area.

16. A three-dimensional (3D) printing system, comprising:
  a supply of build material;
  a build material distributor;
  a supply of a detailing agent fluid including a cationic polymer;
  a supply of a liquid functional material including an anionically stabilized material;
  a single applicator for selectively dispensing the detailing agent fluid and the liquid functional material, the single applicator including an array of nozzles, some to dispense the detailing agent fluid, and others to dispense the liquid functional material;
  a controller; and
  a non-transitory computer readable medium having stored thereon computer executable instructions to cause the controller to:
    utilize the build material distributor to dispense a layer of the build material; and
    utilize the single applicator to selectively dispense, in a single printing pass, the detailing agent fluid onto a portion of the layer of the build material that is outside a patterned area of a 3D object being patterned and the liquid functional material onto another portion of the layer of the build material that is within the patterned area, such that at least some of the anionically stabilized material reacts with at least some of the cationic polymer at edge boundaries of the patterned area to prevent spreading of the anionically stabilized material outside the patterned area and prevent sintering or fusing of ceramic build material outside the patterned area.

\* \* \* \* \*